United States Patent Office 2,761,739
Patented Sept. 4, 1956

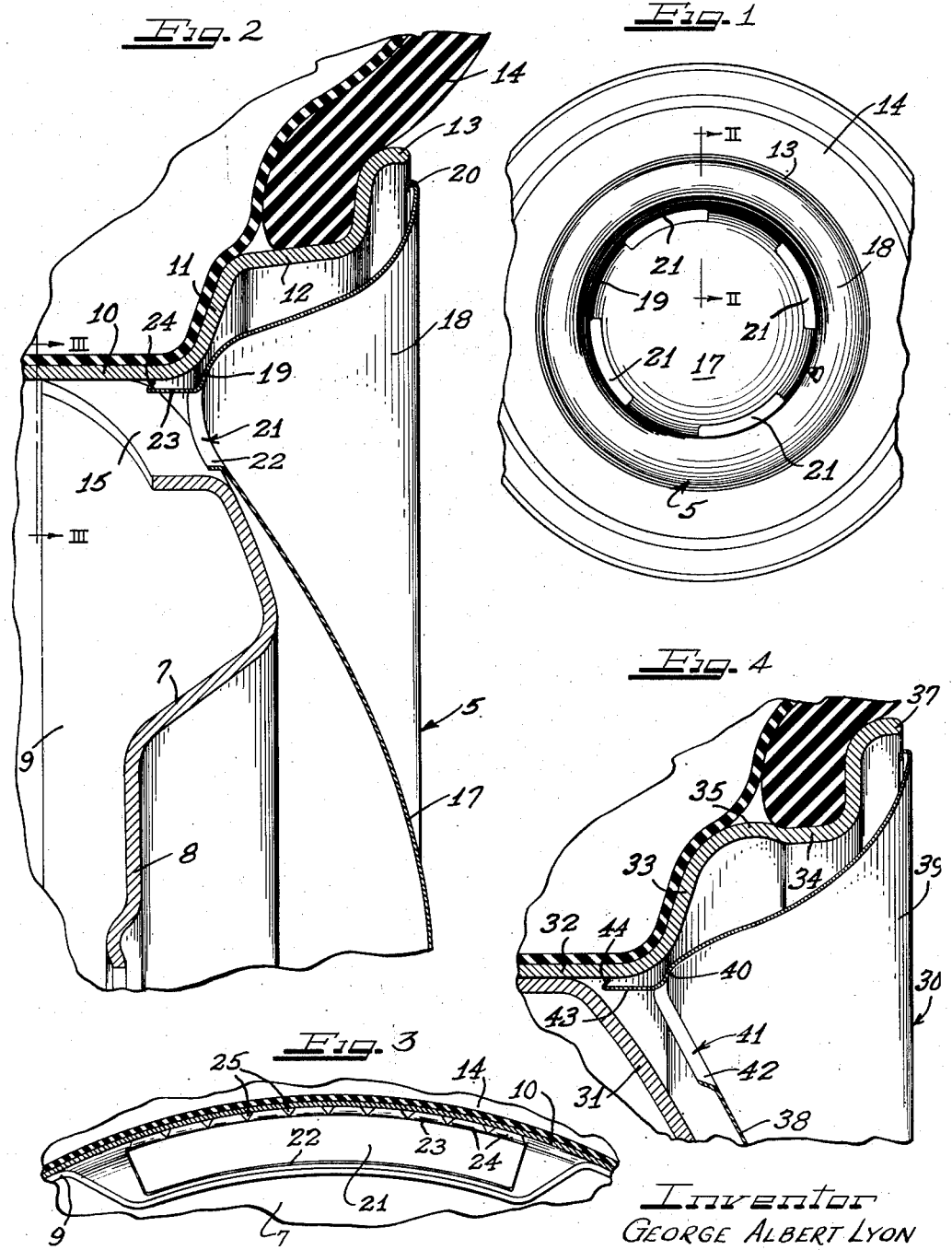

2,761,739

WHEEL COVER

George Albert Lyon, Detroit, Mich.

Application February 18, 1954, Serial No. 411,152

5 Claims. (Cl. 301—37)

The present invention relates to improvements in wheel structures and more particularly concerns the ornamental and protective covering of the outer sides of vehicle wheels.

An important object of the present invention is to provide an improved wheel structure having at the outer side thereof a one-piece self-retaining cover provided with openings for circulation of air therethrough.

Another object of the invention is to provide an improved cover for the outer side of vehicle wheels and having an improved retaining finger structure derived from material struck from openings in the cover.

A further object of the invention is to provide a novel cover structure for the outer sides of vehicle wheels having improved retaining finger means struck therefrom and of novel reinforced retaining characteristics.

Other objects, features, and advantages of the present invention will be readily apparent from the following detailed description of certain preferred embodiments thereof taken in conjunction with the accompanying drawings in which:

Figure 1 is a side elevational view of a vehicle wheel embodying features of the invention;

Figure 2 is a fragmentary enlarged radial sectional view taken on substantially the line II—II of Figure 1;

Figure 3 is a fragmentary sectional elevational view taken on substantially the line III—III of Figure 2; and Figure 4 is a fragmentary radial sectional view showing a modification.

Having reference to Figures 1, 2 and 3, a wheel cover 5 is constructed and arranged to be disposed in covering relation to the outer side of a vehicle wheel comprising a wheel body 7 having a central bolt-on flange 8 by which the wheel is adapted to be attached to an axle part of a vehicle (not shown). About its outer periphery the wheel body 7 is provided with an attachment flange 9 extending generally axially inwardly and attached in suitable manner to a base flange 10 of a tire rim. From the base flange the tire rim has extending an outer side flange 11 directed generally radially outwardly and sloping axially outwardly and merging with an intermediate flange 12 directed generally axially outwardly and sloping radially outwardly and merging with a terminal flange 13. The flanges of the tire rim are related to support a pneumatic tire and tube assembly 14.

At suitable intervals, such as 4, the wheel body flange 9 is inset to provide wheel openings 15 through which air may circulate in the operation of the wheel to cool a brake drum associated with the axle portion of the vehicle to which the wheel may be attached.

According to the present invention, the cover 5 comprises a one-piece sheet metal cover, such as stainless steel, brass or the like, plate and comprising a stamped body member having a central crown portion 17 adapted to overlie the wheel body and an outer annular marginal portion 18 adapted to overlie the tire rim, with an annular dished intermediate portion 19 joining the crown and outer marginal portions and adapted to extend into the substantial groove defined between the wheel body and the tire rim. It will be observed that the inner or crown portion 17 of the cover and the outer marginal portion 18 of the cover are divergently related and that the outer marginal portion has an underturned reinforcing and finished bead-like flange portion 20 which is adapted, in assembly with the wheel, to lie adjacent the tip of the extremity portion of the terminal flange 18.

To enhance air circulation through the wheel and the cover, the cover 5 is provided in the intermediate dished portion 19 thereof with a plurality of openings 21 of arcuate, generally kidney shape arranged to register with the wheel openings 15. Each of the openings 21 is defined by a continuous generally axially inwardly directed reinforcing flange 22 which, in assembly with the wheel, may fit down into the associated wheel opening 15.

For retaining the cover 5 on the wheel, retaining fingers 23 are provided thereon for retaining, gripping engagement with the base flange 10 of the tire rim. Material derived in striking the openings 21 in the cover is utilized for the retaining fingers and comprises axially inward extension of the radially outer side portion of the reinforcing flange 22 defining the respective openings from which the material for the finger is derived in each instance. Each of the retaining fingers 23 is of substantial circumferential dimension or width so that, as best seen in Figure 3, it is of substantial circumferential curvature which affords a desirable resilience in the axially extending finger. In addition, stiffened resilience for the retaining finger is afforded by the integral connection in one piece of the respective sides of the finger with the portions of the flange 22 at the opposite sides of the associated opening 21 and which flange portions afford thrust braces at the opposite sides of the retaining finger.

The retaining fingers 23 are disposed on a diameter which is only slightly smaller at the juncture end of the fingers than the inside diameter of the base flange 10 of the tire rim, while the distal end portions of the fingers 23 are initially disposed on a diameter which is close to the inside diameter of the tire rim base flange. Hence, short and stiff generally radially outwardly and axially outwardly oblique terminal flanges 24 on the fingers 23 will engage in firm retaining gripping relation against the inner face of the base flange 10 by resilient tension created in the retaining fingers 23 as a result of radially inward deflection of the retaining fingers when the cover is pressed axially inwardly to force the retaining terminal flanges 24 into gripping engagement with the base flange. In order to enhance the retaining gripping engagement of the terminal flanges 24, they are sub-divided into a series of retaining flange portions by spaced notches 24 formed to extend from the rim engaging edges of the terminal flanges.

To apply the cover 5, it is generally centered with respect to the wheel and pressed axially inwardly to cause the terminal flanges 24 to cam inwardly along the inner face of the base flange 10 and to enter into firm gripping engagement with the base flange by reason of the resilient tensioning of the retaining fingers 23 by radially inward deflection thereof and by thereby resiliently thrusting the terminal flanges toward and into gripping engagement with the base flange. To remove the cover from the wheel, a pry-off tool, such as a screwdriver (not shown), may be inserted behind the reinforced edge 20 thereof and pry-off force applied to draw the cover axially outwardly and thus draw the retaining fingers 23 from engagement with the tire rim.

In the modification of Figure 4, a cover 30 is applied to the outer side of a vehicle wheel comprising a wheel body 31 attached to a tire rim having a base flange 32 having the outer margin thereof extending substantially axially outwardly beyond the adjacent juncture portion of the wheel body 31. The tire rim is also of the multi-flange, drop-center type having a side flange 33, an intermediate flange 34, which may be provided with a safety rib 35 and which merges with a terminal flange 37.

The cover 30 comprises a central crown portion 38 merging with a divergently directed outer annular portion 39 which is adapted to overlie the tire rim, the two cover portions 38 and 39 being connected by dished annular intermediate portion 40 which fits down into the substantal annular axially outwardly opening groove between the wheel body and the tire rim and adjacent to the tire rim.

A plurality of openings 41 are formed in the wheel cover at the dished intermediate portion 40, with continuous reinforcing flanges 42 defining the openings and having at the radially outer side thereof retaining finger extensions 43. The retaining finger extensions 43 are substantially the same as the retaining finger extensions 23 hereinabove described and have short and stiff radially and axially outwardly oblique retaining terminals 44 thereon engageable in retaining gripping resiliently tensioned engagement with the inner face of the axially outer exposed portion of the base flange 42 of the tire rim.

Application and removal of the cover is effected similarly as application and removal of the cover 5.

It will be understood that modifications and variations may be effected without departing from the scope of the novel concepts of the present invention.

I claim as my invention:

1. In a wheel structure including a wheel body and a tire rim, a cover for the outer side of the wheel comprising a one-piece sheet metal plate having divergently related inner and outer portions for covering respectively the wheel body and the tire rim, with openings at juncture of the inner and outer portions, said openings being defined by continuous flanges thereabout, the radially outer portions of said flanges having retaining finger extensions retainingly engageable with the base flange of the tire rim.

2. In a wheel structure including a wheel body and a tire rim having a base flange with an axially outer inwardly facing portion, a cover for the outer side of the wheel comprising a plate having a series of openings therein disposed for disposition generally adjacent to the juncture of the wheel body and tire rim and defined by continuous reinforcing flanges thereabout, said flanges having retaining finger extensions therefrom retainingly engageable with said radially inwardly facing axially outer portion of the base flange.

3. In a wheel structure including a wheel body and a tire rim having a base flange with an axially outer inwardly facing portion, a cover for the outer side of the wheel comprising a plate having a series of openings therein disposed for disposition generally adjacent to the juncture of the wheel body and tire rim and defined by continuous reinforcing flanges thereabout, said flanges having retaining finger extensions therefrom retainingly engageable with said radially inwardly facing axially outer portion of the base flange, said wheel body having openings therein at juncture with the tire rim and said flanges extending into said wheel openings with the openings in the cover registering with the wheel openings.

4. In a wheel structure including a tire rim having a radially inwardly facing annular base flange, a cover plate for disposition over the outer side of the wheel having a plurality of circumferentially spaced annularly disposed openings therein of generally kidney shape and of substantial circumferential width but narrow radial depth, reinforcing flanges continuously about said openings and extending generally axially inwardly, the flanges at one radial side of the openings having generally axially inwardly directed retaining finger extensions substantially throughout the width of the opening and of circumferential curvature generally conforming to the curvature of the base flange to afford resiliency enhacing arched shape to the retaining fingers, said retaining fingers being disposed on a diameter to lie in assembly with the wheel in adjacent spaced relation to said base flange and having short and stiff generally radially and axially outwardly obliquely extending retaining terminals normally lying with their tips on a slightly greater diameter than the base flange for retaining engagement with the base flange and placing the extensions under radially inward resilient tension for resilient tensioned thrust of the extensions toward said base flange engaging tips of the terminals.

5. In a wheel structure including a tire rim having a radially inwardly facing annular base flange, a cover plate for disposition over the outer side of the wheel having a plurality of circumferentially spaced annularly disposed openings therein of generally kidney shape and of substantial circumferential width but narrow radial depth, reinforcing flanges continuously about said openings and extending generally axially inwardly, the flanges at one radial side of the openings having generally axially inwardly directed retaining finger extensions substantially throughout the width of the opening and of circumferential curvature generally conforming to the curvature of the base flange to afford resiliency enhancing arched shape to the retaining fingers, said retaining fingers being disposed on a diameter to lie in assembly with the wheel in adjacent spaced relation to said base flange and having short and stiff generally radially and axially outwardly obliquely extending retaining terminals normally lying with their tips on a slightly greater diameter than the base flange for retaining engagement with the base flange and placing the extensions under radially inward resilient tension for resilient tensioned thrust of the extensions toward said base flange engaging tips of the terminals, said retaining terminals being sub-divided into a substantial plurality of individual portions by notches extending into the retaining edges of the terminal flanges to the finger extensions.

References Cited in the file of this patent

UNITED STATES PATENTS

| | | |
|---|---|---|
| 2,198,056 | Lyon | Apr. 23, 1940 |
| 2,279,330 | Lyon | Apr. 14, 1942 |
| 2,368,228 | Lyon | Jan. 30, 1945 |
| 2,368,238 | Lyon | Jan. 30, 1945 |
| 2,386,236 | Lyon | Oct. 9, 1945 |
| 2,386,244 | Lyon | Oct. 9, 1945 |
| 2,624,636 | Lyon | Jan. 6, 1953 |